(12) United States Patent
Liermann et al.

(10) Patent No.: US 8,857,472 B2
(45) Date of Patent: Oct. 14, 2014

(54) INTEGRATED HYDRAULIC ACCUMULATOR ARRANGEMENT

(75) Inventors: Matthias Liermann, Essen (DE); Christian Stammen, Kaarst (DE)

(73) Assignee: Siemens Aktiengesellschaft, Munich (DE)

( * ) Notice: Subject to any disclaimer, the term of this patent is extended or adjusted under 35 U.S.C. 154(b) by 364 days.

(21) Appl. No.: 13/498,982

(22) PCT Filed: Aug. 24, 2010

(86) PCT No.: PCT/EP2010/062287
§ 371 (c)(1),
(2), (4) Date: May 17, 2012

(87) PCT Pub. No.: WO2011/038997
PCT Pub. Date: Apr. 7, 2011

(65) Prior Publication Data
US 2012/0216900 A1    Aug. 30, 2012

(30) Foreign Application Priority Data
Sep. 29, 2009   (DE) .......................... 10 2009 048 668

(51) Int. Cl.
*F16L 55/04*    (2006.01)
*B60T 17/06*    (2006.01)
*F15B 1/24*     (2006.01)
*B60T 13/14*    (2006.01)

(52) U.S. Cl.
CPC ........... *B60T 17/06* (2013.01); *F15B 2201/413* (2013.01); *F15B 1/24* (2013.01); *F15B 2201/31* (2013.01); *B60T 13/14* (2013.01)
USPC .......................................................... 138/31

(58) Field of Classification Search
CPC ....... F16L 55/04; F16L 55/045; F16L 55/052; F16L 55/053
USPC .......................................................... 138/31
See application file for complete search history.

(56) References Cited

U.S. PATENT DOCUMENTS 3,054,261 A  *  9/1962  Marette et al. .................. 60/418
3,107,688 A  *  10/1963  Caslow .......................... 137/494
4,000,758 A  *  1/1977  Meisenheimer, Jr. ........... 138/31

(Continued)

FOREIGN PATENT DOCUMENTS

| CN | 101265924 A | 9/2008 |
|----|-------------|--------|
| DE | 3041185 A1  | 5/1982 |
| DE | 3901261 A1  | 7/1990 |
| DE | 19616428 A1 | 10/1997 |

(Continued)

*Primary Examiner* — James Hook
(74) *Attorney, Agent, or Firm* — Laurence A. Greenberg; Werner H. Stemer; Ralph E. Locher

(57) ABSTRACT

A compact and light-weight hydraulic accumulator configuration for a hydraulic brake includes a high-pressure storage chamber, a medium-pressure storage chamber and an atmospheric-pressure storage chamber. The high-pressure storage chamber, the medium-pressure storage chamber and the atmospheric-pressure storage chamber are disposed in a common housing which delimits the high-pressure storage chamber along with a high-pressure piston movably guided within the housing while delimiting the medium-pressure storage chamber along with a medium-pressure piston movably guided within the housing. A high-pressure spring located in the housing rests on the high-pressure piston outside the high-pressure storage chamber and a medium-pressure spring located in the housing rests on the medium-pressure piston outside the medium-pressure storage chamber.

8 Claims, 1 Drawing Sheet

(56) References Cited

U.S. PATENT DOCUMENTS

| | | | |
|---|---|---|---|
| 5,148,834 A * | 9/1992 | Reinartz et al. | 138/31 |
| 6,478,051 B1 | 11/2002 | Drumm et al. | |
| 6,550,872 B1 | 4/2003 | Caldwell | |
| 2003/0075225 A1 | 4/2003 | Dinkel et al. | |
| 2004/0238054 A1 | 12/2004 | Weber | |
| 2004/0250866 A1 | 12/2004 | Bartsch et al. | |
| 2005/0155658 A1 * | 7/2005 | White | 138/31 |
| 2007/0289638 A1 * | 12/2007 | Ishitoya et al. | 137/455 |
| 2008/0284242 A1 | 11/2008 | Ganzel | |

FOREIGN PATENT DOCUMENTS

| | | |
|---|---|---|
| DE | 10207598 A1 | 11/2002 |
| DE | 112005001037 T5 | 5/2007 |
| DE | 102008055663 A1 | 6/2009 |
| EP | 0890494 A2 | 1/1999 |
| GB | 2263753 A | 8/1993 |
| SU | 844424 A1 | 7/1981 |
| WO | 9908916 A1 | 2/1999 |
| WO | 0175312 A2 | 10/2001 |
| WO | 03016723 A2 | 2/2003 |

* cited by examiner

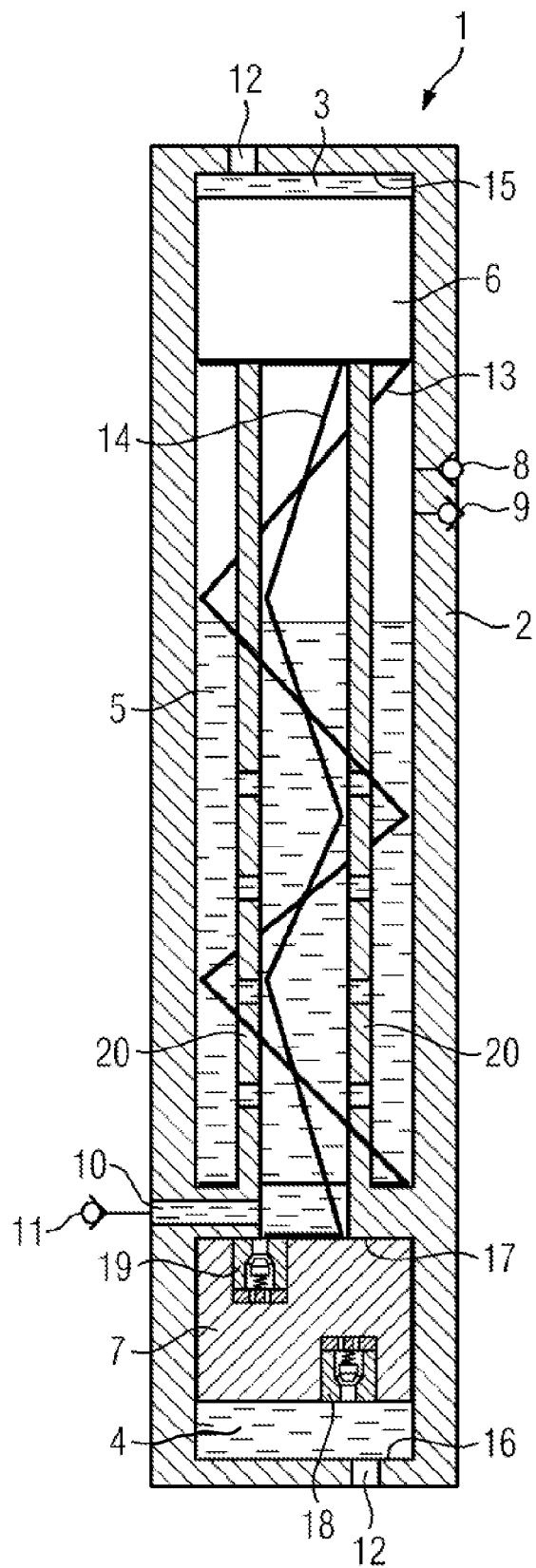

INTEGRATED HYDRAULIC ACCUMULATOR ARRANGEMENT

BACKGROUND OF THE INVENTION

Field of the Invention

The invention relates to a hydraulic accumulator arrangement for a hydraulic brake.

Hydraulic accumulators that are for example part of a hydraulic brake for vehicles generally require resilient elements to ensure a characteristic relationship between the volume of hydraulic fluid taken up and the pressure produced by the accumulator, the said characteristic relationship being necessary during a brake application. For this reason, hydraulic accumulators are used together with gas pressure springs or helical springs. Gas pressure springs are used to avoid the use of a hydraulic accumulator which has an excessively high intrinsic weight, the reason being that gas pressure springs are substantially lighter and more compact than mechanical springs. One disadvantage of gas pressure springs is, however, the high level of temperature dependence of the spring characteristic curve in comparison to that of mechanical springs. Thus, for example in the case of a falling temperature, the gas pressure of a gas pressure spring reduces. For this reason, helical springs are used almost without exception in rail-borne transportation. However, helical springs have the disadvantage that they require a large amount of installation space, which particularly in the case of rail-borne vehicles is frequently not available.

BRIEF SUMMARY OF THE INVENTION

The object of the invention is to provide a hydraulic accumulator arrangement which is compact and light in weight.

The invention achieves this object with a hydraulic accumulator arrangement for a hydraulic brake having a high-pressure storage chamber, a medium-pressure storage chamber and an atmospheric-pressure storage chamber, wherein the high-pressure storage chamber, the medium-pressure storage chamber and the atmospheric-pressure storage chamber are arranged in a common housing, which together with a high-pressure piston that is guided in such a manner as to be able to move within the housing delimits the high-pressure storage chamber and together with a medium-pressure piston that is guided in such a manner as to be able to move within the housing delimits the medium-pressure storage chamber, wherein a high-pressure spring arranged in the housing is supported outside the high-pressure storage chamber on the high-pressure piston and a medium-pressure spring arranged in the housing is supported outside the medium-pressure storage chamber on the medium-pressure piston.

In accordance with the invention, three different storage devices are arranged in a common housing that encompasses all the storage chambers. In addition to an atmospheric-pressure storage chamber that provides a necessary reservoir of hydraulic fluid, a medium-pressure storage chamber is also provided. A medium-pressure storage chamber is necessary to prevent air from flowing into the hydraulic system. The medium-pressure storage device provides a pressure pre-loading to a slightly higher pressure in comparison to the atmospheric pressure. This slightly higher pressure is referred to here as medium pressure. In addition, a high-pressure storage device is used in the case of a hydraulic brake to store for example an amount of energy obtained during a brake application for a next working cycle of the brake. For these reasons, a high-pressure storage device and a medium-pressure storage device are used simultaneously likewise in addition to an atmospheric-pressure storage device, which can also be described as a reservoir.

The hydraulic accumulator arrangement in accordance with the invention comprises moreover a housing and two pistons, wherein the pistons delimit in each case the high-pressure storage chamber and the medium-pressure storage chamber. The two pistons are subjected to a resilient force. Therefore, two springs that are supported in each case on a piston are provided within the scope of the invention. As different compression springs are used, the pistons are pre-loaded to greatly different pressures, so that due to the movability of the pistons the hydraulic fluid in the high-pressure storage chamber and the medium-pressure storage chamber are both subjected to a different pressure. It is naturally necessary that the pistons provide a sealing effect at the housing inner wall, so that no hydraulic fluid can escape from the respective storage chamber. For this purpose, expedient sealing elements such as resiliently mounted piston rings or the like are provided.

In accordance with the invention, only one housing for three hydraulic storage chambers is necessary. As a consequence, on the one hand, this saves weight. In addition, the hydraulic accumulator arrangement in accordance with the invention is also compact and can be constructed in a simple manner.

In an expedient manner, the housing is implemented in a hollow-cylindrical manner, wherein the high-pressure storage chamber and the medium-pressure storage chamber are embodied on mutually remote sides of the hollow-cylindrical housing. In the case of a housing with a hollow-cylindrical design, the pistons that are generally embodied in a shape complementary to a housing region are likewise embodied in a cylindrical manner. In other words, market-conventional cylindrical pistons can be used within the scope of the invention, as a consequence of which the costs of the hydraulic accumulator arrangement are reduced.

In an expedient manner, the medium-pressure spring and the high-pressure spring are embodied as helical springs, wherein the medium-pressure spring extends within the high-pressure spring or the high-pressure spring extends within the medium-pressure spring. In accordance with this advantageous development, the helical springs extend one within the other and therefore in the same installation space. The hydraulic accumulator arrangement is thus even more compact.

In an expedient manner, the high-pressure spring is supported on its side remote from the high-pressure piston on the housing, wherein the medium-pressure spring is supported on its side remote from the medium-pressure piston on the high-pressure piston. In accordance with this advantageous development, the pressure force of the medium-pressure spring is also exploited for the high-pressure storage chamber. Due to the generally small volume of hydraulic fluid in the high-pressure storage device, the high-pressure piston is displaced a comparatively small distance even in the event of the high-pressure storage device being completely emptied, so that the pressure in the medium-pressure storage chamber changes only slightly as the high-pressure piston moves. These slight changes in pressure are acceptable in the case of a hydraulic brake.

In an expedient manner, limiting stops are provided to limit a movement of the high-pressure piston and/or of the medium-pressure piston. The stops are selected in an expedient manner such that sufficient volume is provided for the respective storage device.

In accordance with a development in this respect, the medium-pressure piston delimits on its side remote from the medium-pressure storage chamber the atmospheric-pressure storage chamber. In accordance with this advantageous development, the medium-pressure storage device can contain hydraulic fluid from the atmospheric-pressure storage device, which will be mentioned in more detail hereinbelow.

In an expedient manner, the medium-pressure piston is guided in a longitudinal moveable manner within the housing, wherein two stops are provided, which stops in each case limit the longitudinal movement of the medium-pressure piston in one direction.

In an expedient manner, the medium-pressure piston comprises two valves that cooperate in each case with a stop and, as the medium-pressure piston comes into contact with a respectively associated stop, connect the atmospheric-pressure storage chamber and an external connection of the housing with the medium-pressure storage chamber.

Further advantages and embodiments of the invention are the subject of the following description of an exemplary embodiment of the invention with reference to the attached FIGURE, wherein the:

BRIEF DESCRIPTION OF THE SINGLE VIEW OF THE DRAWING

FIGURE shows a partially sectioned lateral view of an exemplary embodiment of the hydraulic accumulator arrangement in accordance with the invention.

DESCRIPTION OF THE INVENTION

The FIGURE shows a partially sectioned view of an exemplary embodiment of a hydraulic accumulator arrangement 1. The hydraulic accumulator arrangement 1 comprises a hollow-cylindrical housing 2, in which a high-pressure storage chamber 3, a medium-pressure storage chamber 4 and an atmospheric-pressure storage chamber 5 are provided. The high-pressure storage chamber 3 is delimited on the one hand by the housing 2 and by a high-pressure piston 6, the said piston being mounted in a sealing and moveable manner within the housing 2, so that any leakage of hydraulic fluid, with which the high-pressure storage device 3 is filled, is avoided despite the freedom of movement. The housing 2 and a medium-pressure piston 7 delimit the medium-pressure storage chamber 4 accordingly. The atmospheric-pressure storage chamber 5 is likewise delimited by the housing 2 and the medium-pressure piston 7. In other words, the medium-pressure piston 7 separates the atmospheric-pressure storage chamber 5 from the medium-pressure storage chamber 4. For the purpose of ventilating the reservoir, through valves 8 and 9 are provided in the housing 2, the said valves extending through the lateral wall of the housing 2 and rendering it possible to compensate the pressure with the external atmosphere. In addition, the atmospheric-pressure storage chamber 5 communicates with an intake connection 10 that is equipped with a non-return valve 11.

The high-pressure storage chamber 3 and the medium-pressure storage chamber 4 are likewise equipped in each case with an external connection 12. A high-pressure spring 13 and a medium-pressure spring 14 are provided to generate the desired hydraulic pressure, wherein the high-pressure spring 13 is supported on one side on the high-pressure piston 6 and on its side remote from the high-pressure piston 6 is supported on the housing 2. The medium-pressure spring 14 is supported on one side on the medium-pressure piston 7 and on the other side, i.e. on its side remote from the medium-pressure piston 7 is supported on the high-pressure piston 6. Both the high-pressure spring 13 and also the medium-pressure spring 14 are embodied as compression springs or, in other words, as helical springs that extend one inside the other. In the illustrated exemplary embodiment, the medium-pressure spring 14 extends inside the high-pressure spring 13. The high-pressure spring 13 and the medium-pressure spring 14 protrude down the atmospheric-pressure storage device 5 of the hydraulic accumulator arrangement. In this manner, a compact storage device arrangement is provided, which is expedient in particular for hydraulic brakes in rail-borne vehicles. In addition, the hydraulic arrangement is light in weight.

The volume of the high-pressure storage chamber 3 in comparison to other storage devices is low, so that even when the high-pressure storage chamber 3 is completely emptied, the position of the high-pressure piston 6 changes only slightly. Excessively high fluctuations in pressure in the medium-pressure storage device 4 are therefore avoided.

Both the high-pressure piston 6 and also the medium-pressure piston 7 are guided in a longitudinal moveable manner within the housing 2. In other words, they perform a stroke movement. The stroke movement of the high-pressure piston 6 is limited in one direction by a stop. In other words, when the high-pressure storage chamber 3 is completely emptied, the high-pressure piston 6 contacts a first end side 15 of the housing 2, which end side acts as a stop. The medium-pressure piston 7 functions in a corresponding manner, in that it contacts the second end side 16 of the housing 2. In addition, a second stop 17 is provided for the medium-pressure piston, which second stop is arranged on the side of the medium-pressure piston 7 remote from the end side 16. Thus, are limited in the directions of movement of the medium-pressure piston.

The stops 16 and 17 cooperate with two valves 18 and 19 that are arranged in the medium-pressure piston 7. If the medium-pressure piston 7 arrives at the lower stop 16, then the medium-pressure storage chamber 4 is completely emptied. However, the lower valve 18 does open in this case, so that hydraulic fluid can flow from the atmospheric-pressure storage chamber 5 via the medium-pressure piston 7 into the external connection 12 of the medium-pressure storage chamber 4. If the medium-pressure piston 7 arrives at the other stop 17, then the medium-pressure storage chamber 4 is completely filled with hydraulic fluid. The valve 19 opens, so that any excess hydraulic fluid can flow de-pressurized from the medium-pressure storage chamber into the atmospheric-pressure storage chamber 5. In addition, reinforcing webs 20 can also be embodied in the housing 2.

Finally, reference is also made to the fact that the hydraulic pressure in the high-pressure chamber 3 is greater than in the medium-pressure storage chamber 4. The pressure in the medium-pressure storage chamber 4 is on the other hand greater than the atmospheric pressure.

The invention claimed is:

1. A hydraulic accumulator configuration for a hydraulic brake, the configuration comprising:
    a housing;
    a high-pressure storage chamber, a medium-pressure storage chamber and an atmospheric-pressure storage chamber, all being disposed in common in said housing;
    a high-pressure piston guided movably within said housing and delimiting said high-pressure storage chamber together with said housing;
    a medium-pressure piston movable within said housing and delimiting said medium-pressure storage chamber together with said housing;

a high-pressure spring disposed in said housing and supported outside said high-pressure storage chamber on said high-pressure piston; and a medium-pressure spring disposed in said housing and supported outside said medium-pressure storage chamber on said medium-pressure piston.

2. The hydraulic accumulator configuration according to claim 1, wherein said housing is hollow-cylindrical and has mutually remote sides, and said high-pressure storage chamber and said medium-pressure storage chamber are each disposed at a respective one of said mutually remote sides of said hollow-cylindrical housing.

3. The hydraulic accumulator configuration according to claim 2, wherein said medium-pressure spring and said high-pressure spring are helical springs, and said medium-pressure spring extends within said high-pressure spring or said high-pressure spring extends within said medium-pressure spring.

4. The hydraulic accumulator configuration according to claim 3, wherein said high-pressure spring has a side remote from said high-pressure piston being supported on said housing, and said medium-pressure spring has a side remote from said medium-pressure piston being supported on said high-pressure piston.

5. The hydraulic accumulator configuration according to claim 1, which further comprises at least one limiting stop for limiting a movement of at least one of said high-pressure piston or said medium-pressure piston.

6. The hydraulic accumulator configuration according to claim 5, wherein said medium-pressure piston has a side remote from said medium-pressure storage chamber and said side delimits said atmospheric-pressure storage chamber.

7. The hydraulic accumulator configuration according to claim 6, which further comprises two stops, said medium-pressure piston being longitudinal moveably guided within said housing in two directions, and said two stops each limiting longitudinal movement of said medium-pressure piston in a respective one of said two directions.

8. The hydraulic accumulator configuration according to claim 7, wherein:

said housing has an external connection;

said medium-pressure piston includes two valves each cooperating with a respective one of said stops; and said valves alternately connect said external connection or said atmospheric-pressure storage chamber with said medium-pressure storage chamber, as said medium-pressure piston alternately comes into contact with said stops.

* * * * *